United States Patent [19]
Shiraishi et al.

[11] Patent Number: 5,239,499
[45] Date of Patent: Aug. 24, 1993

[54] LOGICAL CIRCUIT THAT PERFORMS MULTIPLE LOGICAL OPERATIONS IN EACH STAGE PROCESSING UNIT

[75] Inventors: Takeshi Shiraishi; Masaki Yajima, both of Tokyo, Japan

[73] Assignee: NEC Corporation, Tokyo, Japan

[21] Appl. No.: 622,063

[22] Filed: Dec. 4, 1990

[30] Foreign Application Priority Data
Dec. 4, 1989 [JP] Japan ............................. 1-315793

[51] Int. Cl.[5] ............................................. G06F 7/50
[52] U.S. Cl. ..................................... 364/786; 364/787
[58] Field of Search ............................... 364/786, 787

[56] References Cited
U.S. PATENT DOCUMENTS

| | | | |
|---|---|---|---|
| 4,323,982 | 4/1982 | Eichrodt et al. | 364/786 |
| 4,439,835 | 3/1984 | Best et al. | 364/786 |
| 4,523,292 | 6/1985 | Armer | 364/786 |
| 5,025,409 | 6/1991 | Goto | 364/786 |

*Primary Examiner*—David H. Malzahn
*Attorney, Agent, or Firm*—Sughrue, Mion, Zinn, Macpeak & Seas

[57] ABSTRACT

A logical circuit comprises a plurality of stage processing units, each of which includes a logical operation processing unit and a carry signal transmission controlling unit. The logical operation processing unit carries out a logical operation process of plural bits of input data, and the carry signal transmission controlling unit controls transmission of a carry signal which is supplied from a carry signal transmission controlling unit of the preceding stage of the stage processing unit. In this structure, the logical operation process is carried out with every group of plural bits of the input data, and the carrying signal is transmitted through the stage processing units which are less in number than that of a conventional logical circuit, so that the processing time of the logical circuit is shortened.

4 Claims, 8 Drawing Sheets

LOGICAL CIRCUIT THAT PERFORMS MULTIPLE LOGICAL OPERATIONS IN EACH STAGE PROCESSING UNIT

FIELD OF THE INVENTION

This invention relates to a logical circuit, and more particularly, to a logical circuit in which logical operation processes of binary input data are carried out.

BACKGROUND OF THE INVENTION

A conventional logical circuit comprises a plurality of stage processing units, each of which includes a logical operation processing unit, a carry signal transmission controlling unit and an arithmetic operation circuit. The logical operation processing unit carries out a logical operation process of corresponding bits of input data. On the other hand, the carry signal transmission controlling unit controls transmission of a carry signal supplied from a carry signal transmission controlling unit of the preceding stage to that of the following stage, and the arithmetic operation circuit generates an arithmetic result by receiving a logical operation result and a carry signal.

According to the conventional logical circuit, however, there is a disadvantage in that the processing speed is not fast sufficiently, for the reason that it takes long time for the carry signal to be transmitted through the carry signal transmission controlling units which are as many as the number of bits of the input data.

SUMMARY OF THE INVENTION

Accordingly, it is an object of the invention to provide a logical circuit in which the processing speed is much increased.

According to the invention, a logical circuit comprises:

a plurality of stage processing units, each of which includes a logical operation processing unit and a carry signal transmission controlling unit;

wherein each logical operation processing unit carries out a logical operation process of plural bits of input data, and the carry signal transmission controlling unit controls transmission of a carry signal which is supplied from a carry signal transmission controlling unit of the preceding stage to that of the following stage.

BRIEF DESCRIPTION OF THE DRAWINGS

The invention will be explained in more detail in conjunction with appended drawings, wherein.

DESCRIPTION OF THE PREFERRED EMBODIMENTS

Before describing a logical circuit according to the invention, the conventional logical circuit briefly described before will be explained in conjunction with FIGS. 1 to 4.

Figure 1:
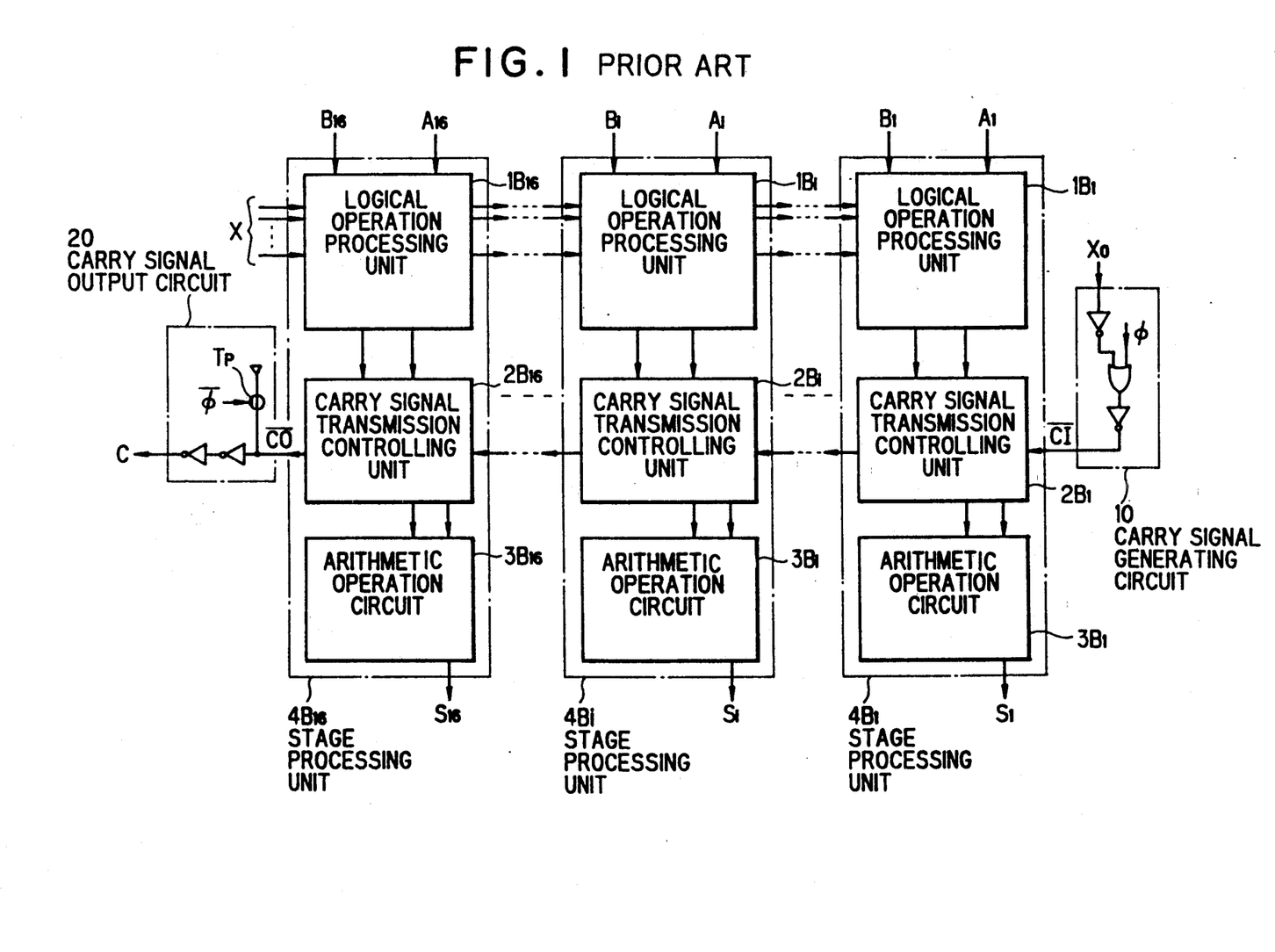
FIG. 1 is a block diagram showing a first conventional logical circuit.

FIG. 1 shows a first conventional logical circuit. The conventional logical circuit comprises sixteen stage processing units $4B_1 \sim 4B_{16}$ which carry out logical processes of two 16-bit input data $(A_{16}, A_{15}, \ldots, A_1)$ and $(B_{16}, B_{15}, \ldots, B_1)$, a carry signal generating circuit 10 which generates an input carry signal $\overline{CI}$ in accordance with a carry signal controlling signal $X_0$ for supplying to the lowest stage logical processing unit $4B_1$, and a carry signal output circuit 20 which supplies an external circuit (not shown) with a carry signal C whose logical level is dependent on an output carry signal $\overline{CO}$ which is supplied from the highest stage processing unit $4B_{16}$. Each stage processing unit $4B_i$ $(i=1, 2, \ldots, 16)$ carries out an arithmetic logical process of corresponding input data bits $A_i (i=1, 2, \ldots, 16)$ and $B_i (i=1, 2, \ldots, 16)$.

The carrying signal generating circuit 10 includes two inverters and an OR circuit, and the carry signal output circuit includes a P-MOS transistor T, connected to a power supply by a source-drain path, and two inverters.

In this first conventional logical circuit, logical operation is carried out by a clock signal $\Phi$, and a kind of arithmetic operation is designated by an operation code X. For instance, arithmetric operation such as addition and subtraction is carried out. The subtraction of $B_i$ from $A_i$ is converted to an equation of "$A_i + \overline{B_i} + 1$", wherein the carry signal controlling signal $X_0$ is set to be "0".

Figure 2:
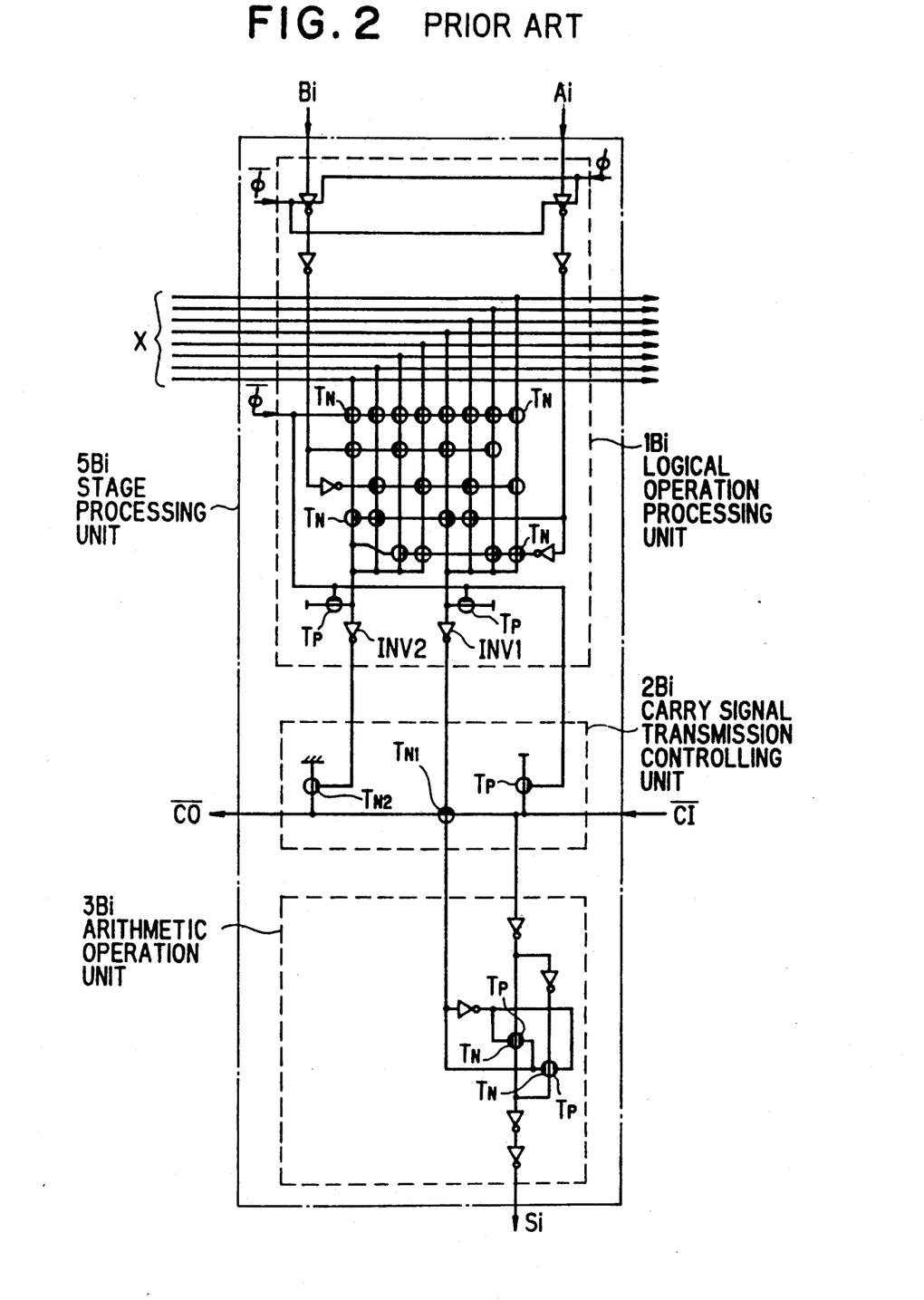
FIG. 2 is a circuit diagram showing a stage processing unit of the first conventional logical circuit.

FIG. 2 is a circuit diagram showing the stage processing unit $4B_i (i=1, 2, \ldots, 16)$. The stage processing unit $4B_i (i=1, 2, \ldots, 16)$ comprises a logical operation processing unit $1B_i (i=1, 2, \ldots, 16)$, a carry signal transmission controlling unit $2B_i (i=1, 2, \ldots, 16)$, and an arithmetic operation circuit $3B_i (i=1, 2, \ldots, 16)$.

The circuitry structure of the logical operation processing unit $1B_i (i=1, 2, \ldots, 16)$, the carry signal transmission controlling unit $2B_i (i=1, 2, \ldots, 16)$, and the arithmetic operation unit $3B_i (i=1, 2, \ldots, \neq)$ is understood in FIG. 2 by the circuitry diagram using typical symbolic representations, especially, among which each $T_N$, and $T_{N1}$ and $T_{N2}$ represent N-MOS transistors, each $T_p$, represents P-MOS transistor, and $INV_1$ and $INV_2$ represent inverters. Here, it should be noted that like parts and signals are indicated by like reference letters and symbols throughout the appended drawings.

In operation, the carry signal generating circuit 10 generates the input carry signal $\overline{CI}$ whose logical level is determined in accordance with the carry signal controlling signal $X_0$, to be supplied to the carry signal transmission controlling unit $2B_1$, which belongs to the lowest stage processing unit $4B_1$. On the other hand, each logical operation processing unit $1B_i (i=1, 2, \ldots, 16)$ of each stage processing unit $4B_i (i=1, 2, \ldots, 16)$ carries out a logical arithmetic operation process of the corresponding input data bits $A_i (i=1, 2, \ldots, 16)$ and $B_i$ $(i=1, 2, \ldots, 16)$ in accordance with the operation code X. Then, the carry signal transmission controlling unit $2B_i (i=1, 2, \ldots, 16)$, which is supplied with the input carry signal $\overline{CI}$ from the preceding stage processing unit $4B_{i-1} (i=2, 3, \ldots, 16)$, supplies an output carry signal $\overline{CO}$, whose logical level is determined in accordance with a logical level produced as a result of the logical operation process in the logical operation processing unit $1B_i (i=1, 2, \ldots, 16)$, to the following stage processing unit $4B_{i+1} (i=1, 2, \ldots, 15)$. The arithmetic operation circuit $3B_i (i=1, 2, \ldots, 16)$ produces a sum signal $S_i (i=1, 2, \ldots, 16)$ in accordance with the logical level as the result of the logical arithmetic operation process in the logical operation processing unit $1B_i (i=1, 2, \ldots, 16)$ and a logical level of the carry signal $\overline{CI}$.

In summary of this operation, a truth table is described below.

| Ai | Bi | $\overline{CI}$ | INV1 | INV2 | Si | $\overline{CO}$ |
|---|---|---|---|---|---|---|
| 0 | 0 | 0 | 0 | 0 | 1 | 1 |
| 0 | 0 | 1 | 0 | 0 | 0 | 1 |
| 0 | 1 | 0 | 1 | 0 | 0 | 0 |
| 0 | 1 | 1 | 1 | 0 | 1 | 1 |
| 1 | 0 | 0 | 1 | 0 | 0 | 0 |
| 1 | 0 | 1 | 1 | 0 | 1 | 1 |
| 1 | 1 | 0 | 0 | 1 | 1 | 0 |
| 1 | 1 | 1 | 0 | 1 | 0 | 0 |

In this structure, the logical operation process is carried out with each bit pair of the input data $A_i (i=1, 2, \ldots, 16)$ and $B_i (i=1, 2, \ldots, 16)$, and the carry signal is transmitted through the N-MOS transistor $T_{N1}$ of the carrying signal transmission controlling units $2B_1 \sim 2B_{16}$ of the stage processing units $4B_1 \sim 4B_{16}$ whose number is as many as that of bits of the input data $(A_{16}, A_{15}, \ldots, A_1)$ and $(B_{16}, B_{15}, \ldots, B_1)$, so that it takes relatively long time to complete the whole logical processes in the logical circuit.

Figure 3:
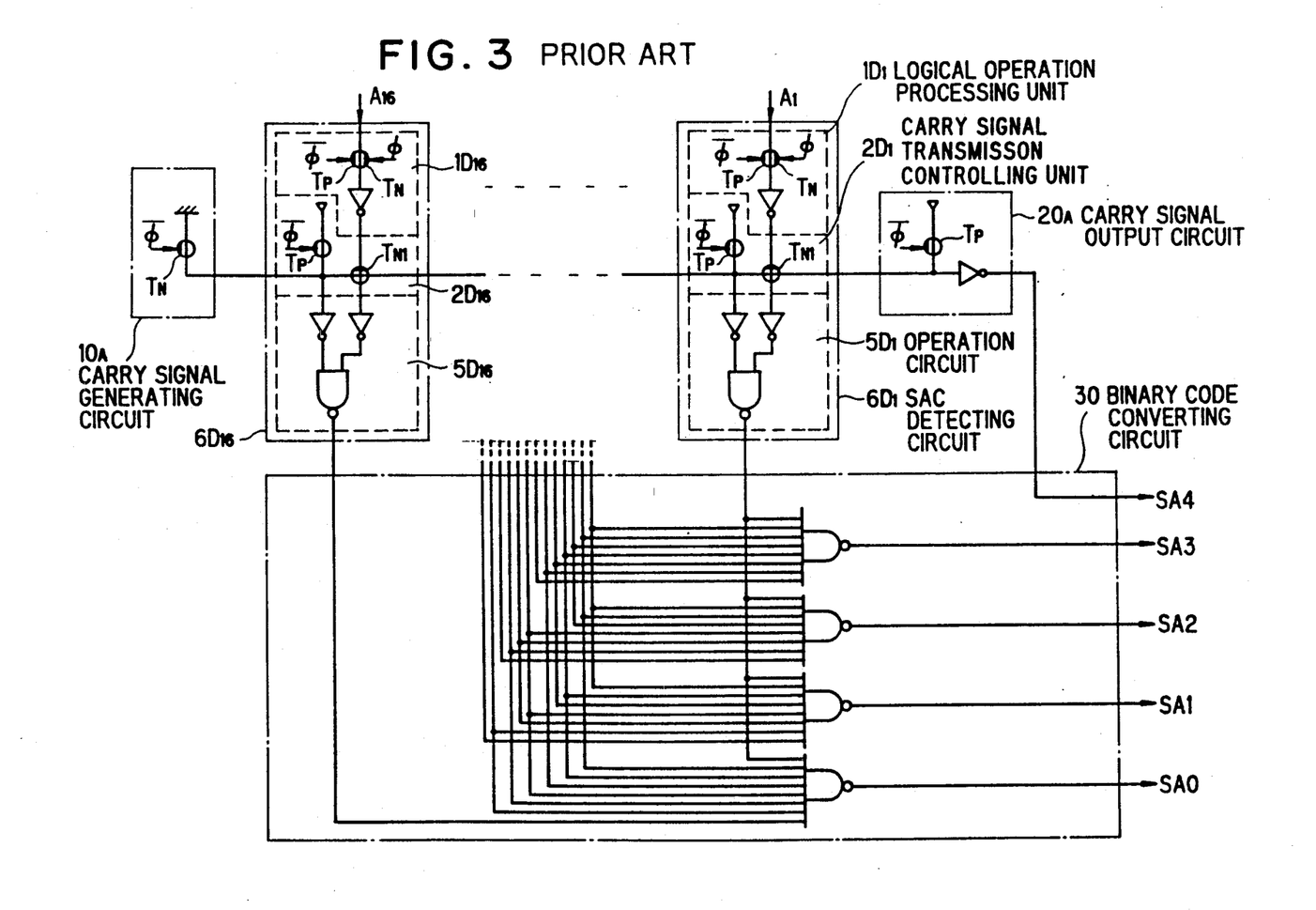
FIG. 3 is a circuit diagram showing a second conventional logical circuit.

FIG. 3 is a circuit diagram showing a second conventional logical circuit. The logical circuit comprises sixteen SAC (Shift And Counter) detecting circuits $6D_1 \sim 6D_{16}$ which detect the number of consecutive bits having a logical level of "0" from the MSB of input data $(A_{16}, A_{15}, \ldots, A_1)$, a carry signal generating circuit $10_A$, a carry signal output circuit $20_A$, and a binary code converting circuit 30. Each SAC detecting circuit $6D_i$ $(i=1, 2, \ldots, 16)$ comprises a logical operation processing unit $1D_i (i=1, 2, \ldots, 16)$, a carry signal transmission controlling unit $2D_i (i=1, 2, \ldots, 16)$, and an operation circuit $5D_i (i=1, 2, \ldots, 16)$.

Figure 4:
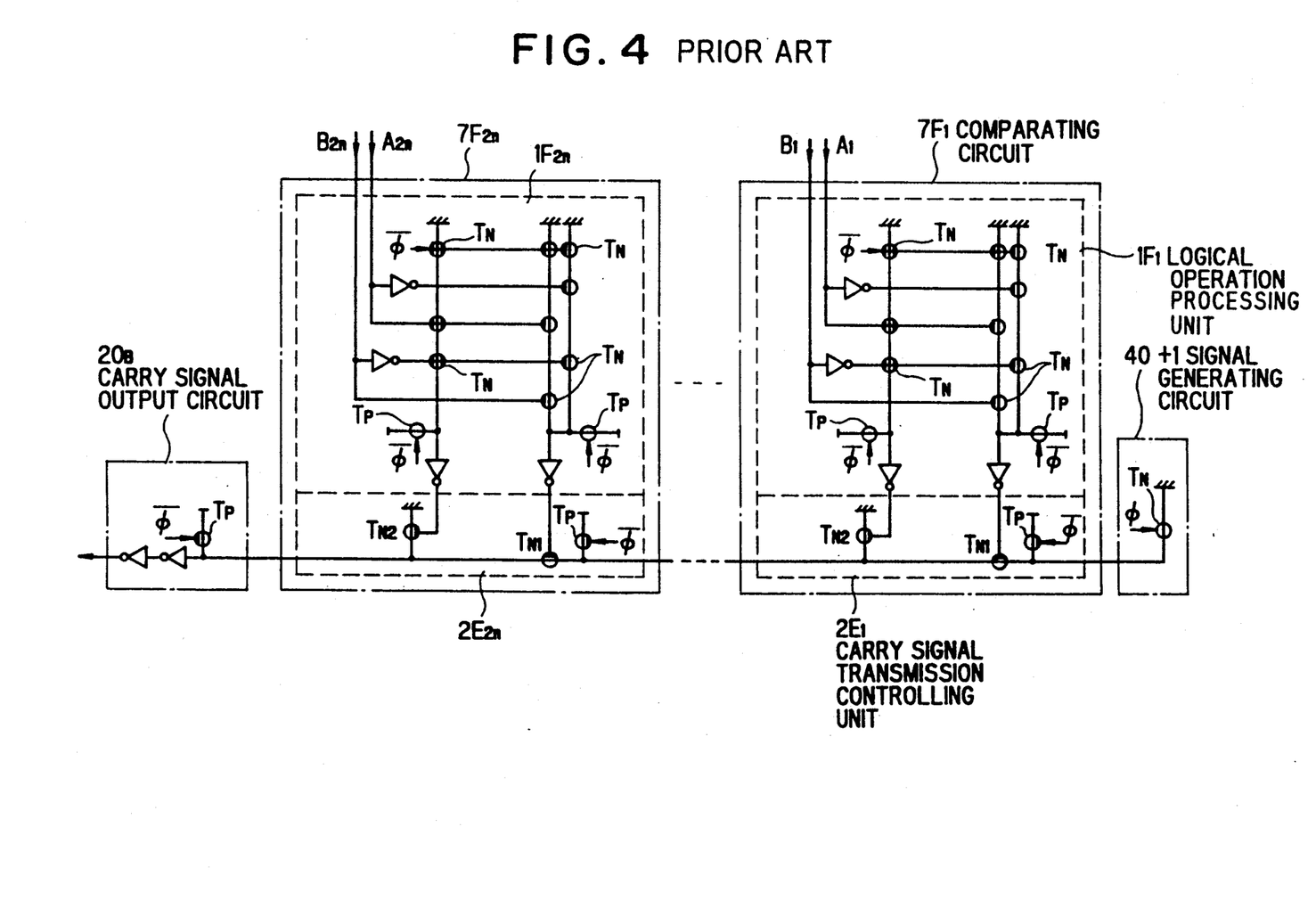
FIG. 4 is a circuit diagram showing a third conventional logical circuit.

FIG. 4 is a circuit diagram showing a third conventional logical circuit. The logical circuit comprises a plurality (2n) of comparing circuits $7F_1 \sim 7F_{2n}$ which distinguish the larger data from another between two data $(A_{2n}, A_{2n-1}, \ldots, A_1)$ and $(B_{2n}, B_{2n-1}, \ldots, B_1)$, a +1 signal generating circuit 40, and a carry signal output circuit $20_B$. Each comparing circuit $7F_i (i=1, 2, \ldots, 2n)$ comprises a logical operation processing unit $1F_i$ $(i=1, 2, \ldots, 2n)$ and a carry signal transmission controlling unit $2F_i (i=1, 2, \ldots, 2n)$.

In the second and third conventional logical circuits, the carry signal transmission controlling unit of each stage includes the N-MOS transistor $T_{N1}$, through which the carry signal is transmitted. Therefore, there is the same disadvantage as that in the first conventional logical circuit.

Figure 5:
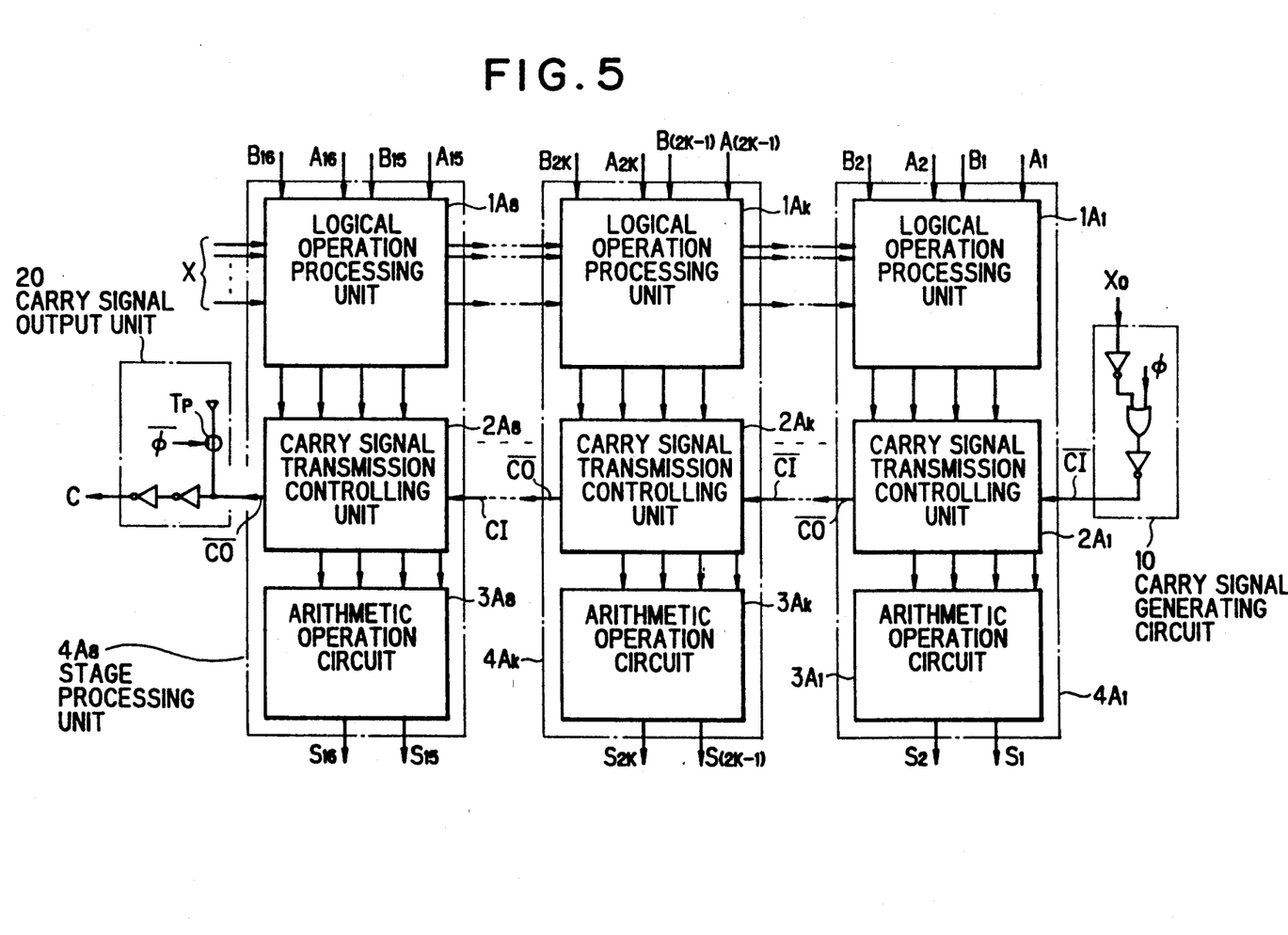
FIG. 5 is a block diagram showing a logical circuit in a first preferred embodiment according to the invention.

Next, FIG. 5 is a block diagram showing a logical circuit in a first preferred embodiment according to the invention. The logical circuit comprises eight stage processing units $4A_1 \sim 4A_8$ which carry out logical processes of 16-bit input data $(A_{16}, A_{15}, \ldots, A_1)$ and $(B_{16}, B_{15}, \ldots, B_1)$ with every two bits of the input data $A_{2k}$ and $B_{2k}$, and $A_{2k-1}$ and $B_{2k-1}$ $(k=1, 2, \ldots, 8)$, a carry signal generating circuit 10 which generates a carry signal, and a carry signal output circuit 20 which supplies an external circuit (not shown) with the carry signal C whose logical level is dependent on an output carry signal $\overline{CO}$ which is supplied from the highest stage processing unit $4A_8$.

Figure 6:
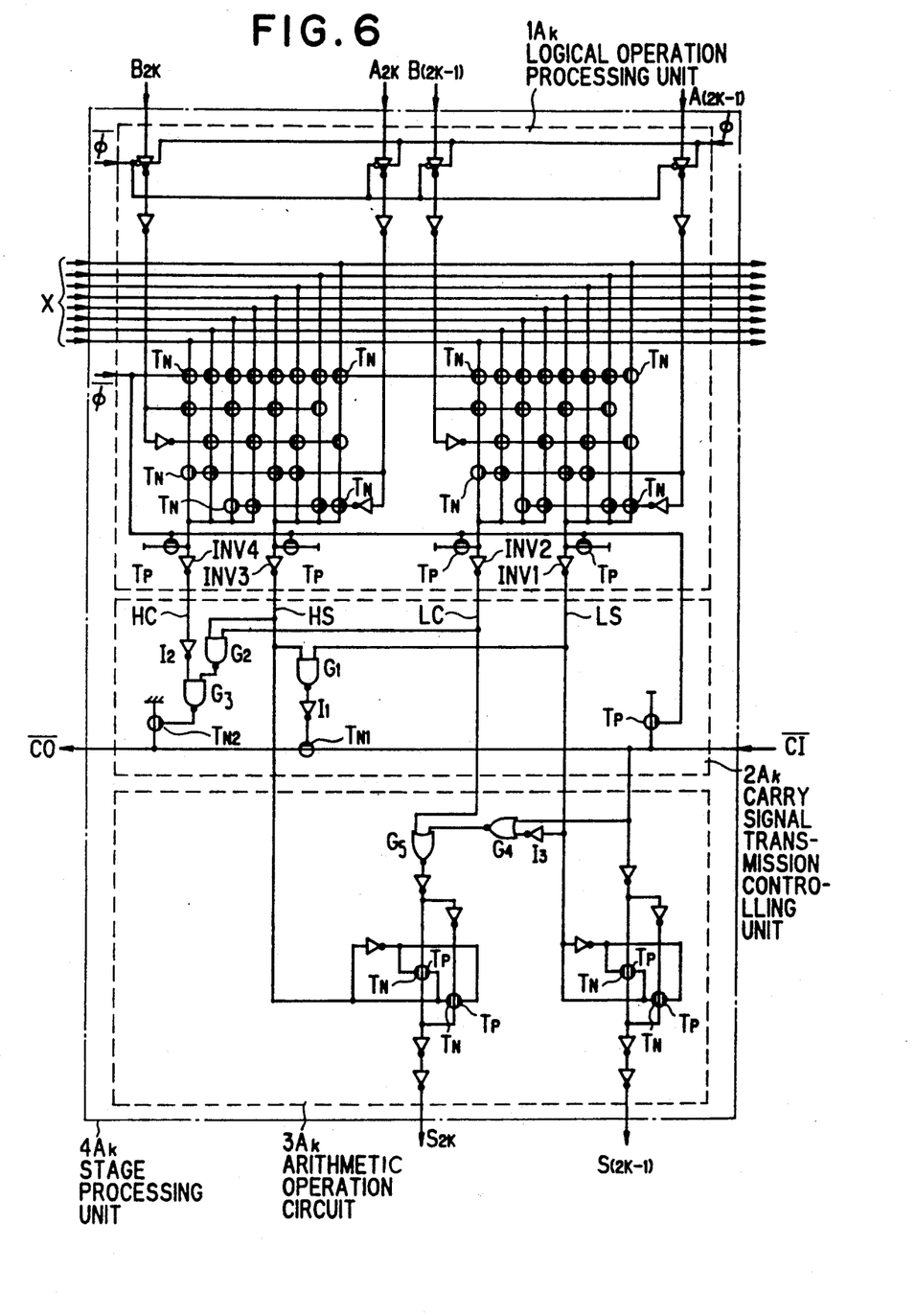
FIG. 6 is a circuit diagram showing a stage processing unit of the logical circuit in the first preferred embodiment according to the invention.

FIG. 6 is a circuit diagram showing a stage processing unit $4A_k (k=1, 2, \ldots, 8)$. The stage processing unit $4A_k$ $(k=1, 2, \ldots, 8)$ comprises a logical operation processing unit $1A_k$ $(k=1, 2, \ldots, 8)$, a carry signal transmission controlling unit $2A_k$ $(k=1, 2, \ldots, 8)$, and an arithmetic operation circuit $3A_k$ $(k=1, 2, \ldots, 8)$.

In operation, the carry signal generating circuit 10 generates the input carry signal $\overline{CI}$ whose logical level is determined in accordance with a carry signal controlling signal $X_0$, to be supplied to the carry signal transmission controlling unit $2A_1$ which belongs to the lowest stage processing unit $4A_1$. On the other hand, each logical operation processing unit $1A_k (k=1, 2, \ldots, 8)$ of each stage processing unit $4A_k$ $(k=1, 2, \ldots, 8)$ carries out a logical arithmetic operation process of two bit pairs of the corresponding input data $A_{2k-1}$ and $B_{2k-1}$, and $A_{2k}$ and $B_{2k}$ $(k=1, 2, \ldots, 8)$ in accordance with an operation code X. Then, the carry signal transmission controlling unit $2A_k$ $(k=1, 2, \ldots, 8)$, which is supplied with the input carry signal $\overline{CI}$ from the preceding stage processing unit $4A_{k-1}$ $(k=2, 3, \ldots, 8)$, supplies an output carry signal $\overline{CO}$ whose logical level is determined in accordance with a logical level produced as a result of the logical operation process in the logical operation processing unit $1A_k$ $(k=1, 2, \ldots, 8)$, to the following stage processing unit $4A_{k+1} (k=1, 2, \ldots, 7)$. The arithmetic operation circuit $3A_k$ $(k=1, 2, \ldots, 8)$ produces sum signals $S_{(2k-1)}$ and $S_{2k}(k=1, 2, \ldots, 8)$ in accordance with the logical level as the result of the logical arithmetic operation process in the logical operation processing unit $1A_k (k=1, 2, \ldots, 8)$ and a logical level of the input carry signal $\overline{CI}$.

In this preferred embodiment, an ON/OFF state of an N-MOS transistor $T_{N1}$ is controlled by a logical level dependent on the result of the logical operation process of two bit pairs of the input data, so that the controlling of transmission of the input carry signal $\overline{CI}$ from the preceding stage processing unit $4A_{k-1}$ $(k=2, 3, \ldots, 8)$ to the following stage processing unit $4A_{k+1}$ $(k=1, 2, \ldots, 7)$ is carried out by the transistors $T_{N1}$ whose number is half as that of transistors $T_{N1}$ in a conventional logical circuit.

In more practical operation, it is supposed that each logical operation process of two bit pairs of the input data $A_{2k}$ and $B_{2k}$, and $A_{2k-1}$ and $B_{2k-1}$ $(k=1, 2, \ldots, 8)$ is carried out, respectively, in the logical operation processing unit $1A_k (k=1, 2, \ldots, 8)$ in accordance with the operation code X, and that the carry signal transmission controlling unit $2A_k$ $(k=1, 2, \ldots, 8)$ is supplied at terminals with signals such that HC=0, LC=0, HS=1, LS=1, and $\overline{CI}$=0. In this case, a two-input NAND gate $G_1$, which is supplied with signals such that HS=1 and LS=1, produces a logical level "0", so that an inverter gate $I_1$, which is connected at an input to an output of the NAND gate $G_1$, produces a logical level "1". On the other hand, a two-input NAND gate $G_2$, which is supplied with signals such that $HS=1$ and $LC=0$, produces a logical level "1", so that a two-input NAND gate $G_3$, which is supplied with outputs of the NAND gate $G_2$ and an inverter gate $I_2$ which produces a logical level "1" of an inverter logical level "0" of HC, produces a logical level "0". As a result, a logical level "0" of the input carry signal $\overline{CI}$ is transmitted to the output carry signal $\overline{CO}$ after a precharging time.

In the arithmetic operation circuit $3A_k$ ($k=1, 2, \ldots, 8$), a sum signal $S_{2k-1}$ ($k=1, 2, \ldots, 8$) becomes a logical level "0", as $\overline{CI}=0$ and $LS=1$. On the other hand, an inverter gate $I_3$, which is supplied with a logical level "1" of LS, produces a logical level "0", a two-input NOR gate $G_4$, which is supplied with a logical level "0" of an output of the inverter gate $I_3$ and $\overline{CI}$, produces a logical level "1", and a two-input NOR gate $G_5$, which is supplied with a logical level "1" of an output of the NOR gate $G_4$ and LC, produces a logical level "0", so that the sum signal $S_{2k}$ ($k=1, 2, \ldots, 8$) becomes a logical level "0".

Figure 7:
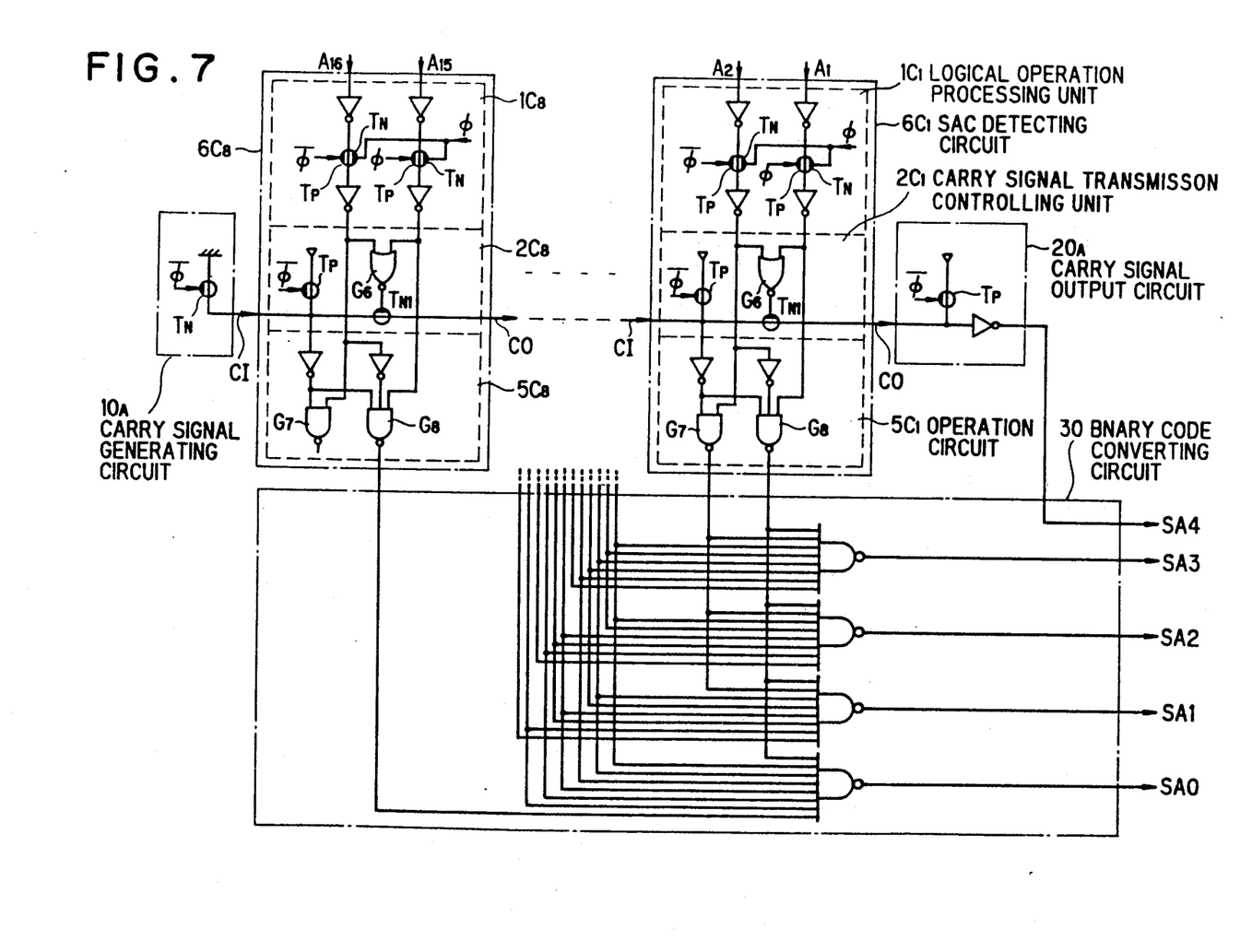
FIG. 7 is a circuit diagram showing a logical circuit in a second preferred embodiment according to the invention.

In summary of this operation, a truth table is described below.

dependent on the result of the logical operation process of a bit pair of the input data $A_{2k}$ and $A_{2k-1}$ ($k=1, 2, \ldots, 8$), so that the controlling of transmission of an input carry signal CI from the SAC detecting circuit $6C_{k-1}$ ($k=2, 3, \ldots 8$) of the preceding stage to the SAC detecting circuit $6C_{k+1}$ ($k=1, 2, \ldots, 7$) of the following stage is carried out by the transistors $T_{N1}$ whose number is half as that of transistors $T_{N1}$ in a conventional logical circuit. The input data ($A_{16} \ldots A_1$) which are detected by the SAC detecting circuits $6C_1 \sim 6C_8$ are converted into a binary code by the binary code converting circuit 30, and the number of consecutive input data bits having a logical level of "0" from the MSB is indicated as a binary code.

Figure 8:
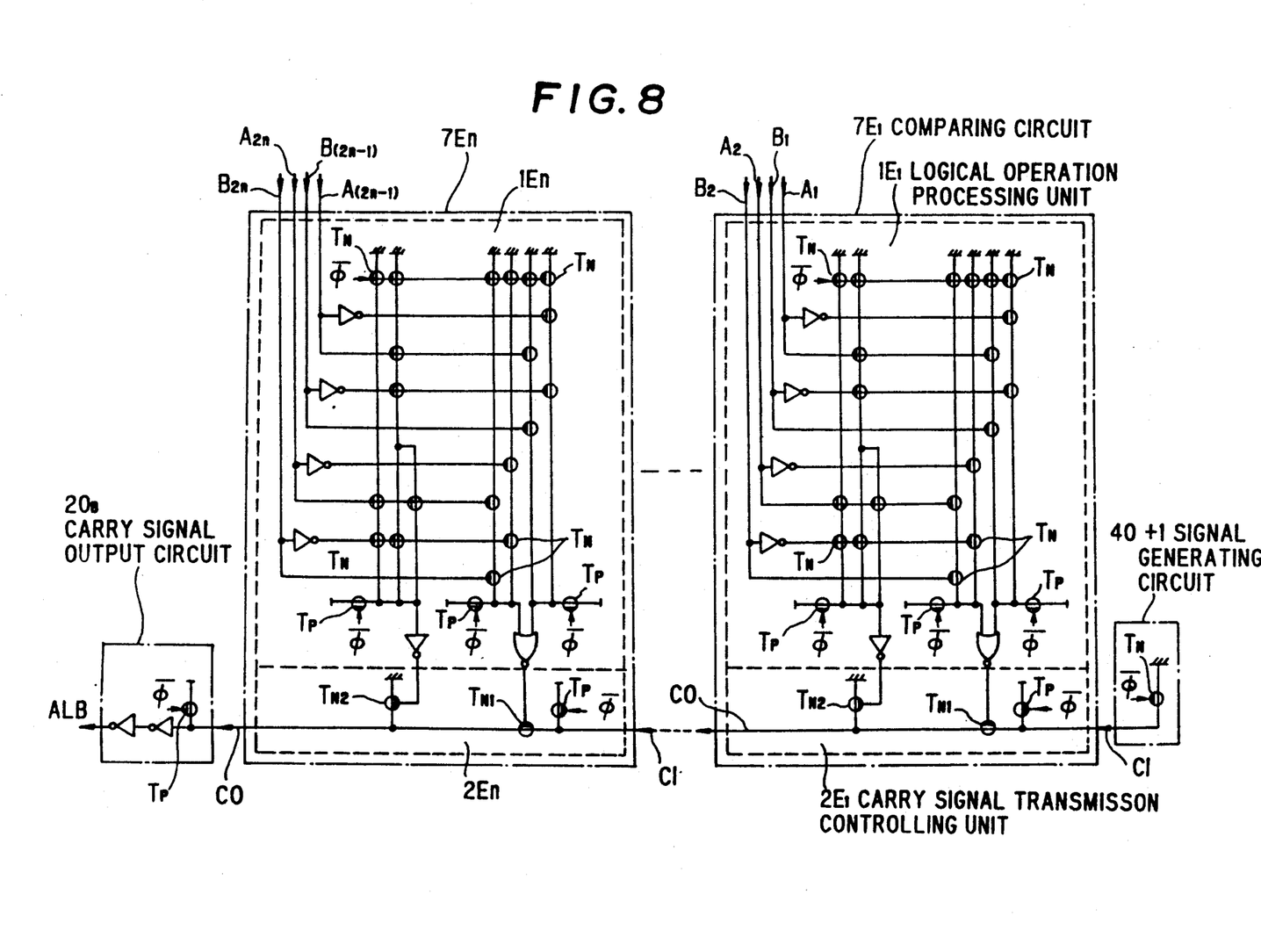
FIG. 8 is a circuit diagram showing a logical circuit in a third preferred embodiment according to the invention.

FIG. 8 is a circuit diagram showing a logical circuit in a third preferred embodiment according to the invention. The logical circuit comprises a plurality (n) of comparing circuits $7E_1 \sim 7E_n$ which distinguish the larger data from another between ($A_{2n} \ldots A_1$) and ($B_{2n} \ldots B_1$) with every two bit pairs of input data $A_{2k}$ and $B_{2k}$, and $A_{2k-1}$ and $B_{2k-1}$ ($k=1, 2, \ldots, 8$), a $+1$ signal generating circuit 40, and a carry signal output circuit $20_3$. Each comparing circuit $7E_k$ ($k=1, 2, \ldots n$) com-

| A(2k − 1) | B(2k − 1) | A 2k | B 2k | $\overline{CI}$ | INV1 | INV2 | INV3 | INV4 | I1 | C3 | S(2k − 1) | S 2k | $\overline{CO}$ |
|---|---|---|---|---|---|---|---|---|---|---|---|---|---|
| 0 | 0 | 0 | 0 | 0 | 0 | 0 | 0 | 0 | 0 | 0 | 1 | 0 | 1 |
| 0 | 0 | 0 | 0 | 1 | 0 | 0 | 0 | 0 | 0 | 0 | 0 | 0 | 1 |
| 0 | 0 | 0 | 1 | 0 | 0 | 0 | 1 | 0 | 0 | 0 | 1 | 1 | 1 |
| 0 | 0 | 0 | 1 | 1 | 0 | 0 | 1 | 0 | 0 | 0 | 0 | 1 | 1 |
| 0 | 0 | 1 | 0 | 0 | 0 | 0 | 1 | 0 | 0 | 0 | 1 | 1 | 1 |
| 0 | 0 | 1 | 0 | 1 | 0 | 0 | 1 | 0 | 0 | 0 | 0 | 1 | 1 |
| 0 | 0 | 1 | 1 | 0 | 0 | 0 | 0 | 1 | 0 | 0 | 1 | 0 | 0 |
| 0 | 0 | 1 | 1 | 1 | 0 | 0 | 0 | 1 | 0 | 0 | 0 | 0 | 0 |
| 0 | 1 | 0 | 0 | 0 | 1 | 0 | 0 | 0 | 0 | 0 | 0 | 1 | 1 |
| 0 | 1 | 0 | 0 | 1 | 1 | 0 | 0 | 0 | 0 | 0 | 1 | 0 | 1 |
| 0 | 1 | 0 | 1 | 0 | 1 | 0 | 1 | 0 | 1 | 0 | 0 | 0 | 0 |
| 0 | 1 | 0 | 1 | 1 | 1 | 0 | 1 | 0 | 1 | 0 | 1 | 1 | 1 |
| 0 | 1 | 1 | 0 | 0 | 1 | 0 | 1 | 0 | 1 | 0 | 0 | 0 | 0 |
| 0 | 1 | 1 | 0 | 1 | 1 | 0 | 1 | 0 | 1 | 0 | 1 | 1 | 1 |
| 0 | 1 | 1 | 1 | 0 | 1 | 0 | 0 | 1 | 0 | 0 | 0 | 1 | 0 |
| 0 | 1 | 1 | 1 | 1 | 1 | 0 | 0 | 1 | 0 | 0 | 1 | 0 | 0 |
| 1 | 0 | 0 | 0 | 0 | 1 | 0 | 0 | 0 | 0 | 0 | 0 | 1 | 1 |
| 1 | 0 | 0 | 0 | 1 | 1 | 0 | 0 | 0 | 0 | 0 | 1 | 0 | 1 |
| 1 | 0 | 0 | 1 | 0 | 1 | 0 | 1 | 0 | 1 | 0 | 0 | 0 | 0 |
| 1 | 0 | 0 | 1 | 1 | 1 | 0 | 1 | 0 | 1 | 0 | 1 | 1 | 1 |
| 1 | 0 | 1 | 0 | 0 | 1 | 0 | 1 | 0 | 1 | 0 | 0 | 0 | 0 |
| 1 | 0 | 1 | 0 | 1 | 1 | 0 | 1 | 0 | 1 | 0 | 1 | 1 | 1 |
| 1 | 0 | 1 | 1 | 0 | 1 | 0 | 0 | 1 | 0 | 0 | 0 | 1 | 0 |
| 1 | 0 | 1 | 1 | 1 | 1 | 0 | 0 | 1 | 0 | 0 | 1 | 0 | 0 |
| 1 | 1 | 0 | 0 | 0 | 0 | 1 | 0 | 0 | 0 | 0 | 1 | 1 | 1 |
| 1 | 1 | 0 | 0 | 1 | 0 | 1 | 0 | 0 | 0 | 0 | 0 | 1 | 1 |
| 1 | 1 | 0 | 1 | 0 | 0 | 1 | 1 | 0 | 0 | 1 | 1 | 0 | 0 |
| 1 | 1 | 0 | 1 | 1 | 0 | 1 | 1 | 0 | 0 | 1 | 0 | 0 | 0 |
| 1 | 1 | 1 | 0 | 0 | 0 | 1 | 1 | 0 | 0 | 1 | 1 | 0 | 0 |
| 1 | 1 | 1 | 0 | 1 | 0 | 1 | 1 | 0 | 0 | 1 | 0 | 0 | 0 |
| 1 | 1 | 1 | 1 | 0 | 0 | 1 | 0 | 1 | 0 | 1 | 1 | 1 | 0 |
| 1 | 1 | 1 | 1 | 1 | 0 | 1 | 0 | 1 | 0 | 1 | 0 | 1 | 0 |

FIG. 7 is a circuit diagram showing a logical circuit in a second preferred embodiment according to the invention. The logical circuit comprises eight SAC detecting circuits $6C_1 \sim 6C_8$ which detect a number of consecutive bits having a logical level of "0" from the MSB of input data ($A_{16}, A_{15}, \ldots A_1$) with every bit pair of input data $A_{2k}$ and $A_{2k-1}$ ($k=1, 2, \ldots, 8$), a carry signal generating circuit $10_4$, a carry signal output circuit $20_4$, and a binary code converting circuit 30. Each SAC detecting circuit $6C_k$ ($k=1, 2, \ldots, 8$) comprises a logical operation processing unit $1C_k$ ($k=1, 2, \ldots, 8$), a carry signal transmission controlling units $2C_k$ ($k=1, 2, \ldots, 8$) and an operation circuit $5C_k$ ($k=1, 2, \ldots, 8$).

In this preferred embodiment, an ON/OFF state of an N-MOS transistor $T_{N1}$ is controlled by a logical level prises a logical operation processing unit $1E_k$ ($k=1, 2, \ldots n$) and a carry signal transmission controlling unit $2E_k$ ($k=1, 2, \ldots n$).

In this preferred embodiment, an ON/OFF state of an N-MOS transistor $T_{N1}$ is controlled by a logical level dependent on the result of the logical operation process of two bit pairs of the input data, like the case in the first preferred embodiment, and the same advantage is expected.

In the first to third preferred embodiments, operation process is carried out by dividing input data into plural groups, and the number of steps through which the carry signal is transmitted is less than that in conventional logical circuits, so that the whole logical processing time is shortened.

Although the invention has been described will respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A logical circuit, comprising:

stage processing units of n in number, each of which includes a logical operation processing unit and a carry signal transmission controlling unit;

wherein each of said logical operation processing units is provided with two first input terminals for receiving two first bit signals of first input data of 2n bits and two second input terminals for receiving two second bit signals of second input data of 2n bits, said two first and second bit signals being obtained by dividing said first and second input data by n, respectively, each of said logical operation processing units being provided with first to fourth output terminals for supplying first to fourth logical operation output signals; and wherein each of said carry signal transmission controlling units comprises:

a transistor gate provided on a transmission line for transmitting a carry signal from a preceding stage processing unit to a following stage processing unit, said transistor gate being turned on and off by said first and third logical operation output signals, and first and second transistor means for applying high and low logical levels to said transistor gate said first transistor means applying said high logical level to said transmission line based on an inverter clock signal, and said second transistor means applying said low logical level to said transmission line based on said second to fourth logical operation output signals.

2. A logical circuit, according to claim 1, wherein:
each of said logical operation processing units carries out a logical arithmetic operation process of said first and second input data.

3. A logical circuit, according to claim 1, wherein:
each of said stage processing units includes shift and count detection means for detecting a number of consecutive bits having a logical level of "0" from either the most significant bit or the least significant bit.

4. A logical circuit, according to claim 2, wherein:
each of said stage processing units includes comparing means for performing a comparing operation process in which data having a larger quantity is distinguished from data having a smaller quantity.

* * * * *